June 15, 1965 C. CANFIELD 3,189,003
ANIMAL TETHER DEVICES
Filed Nov. 16, 1962
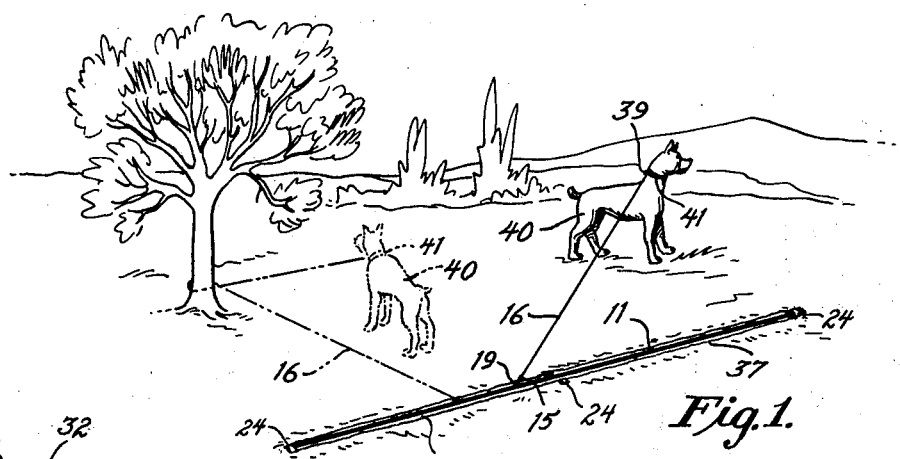
Fig.1.
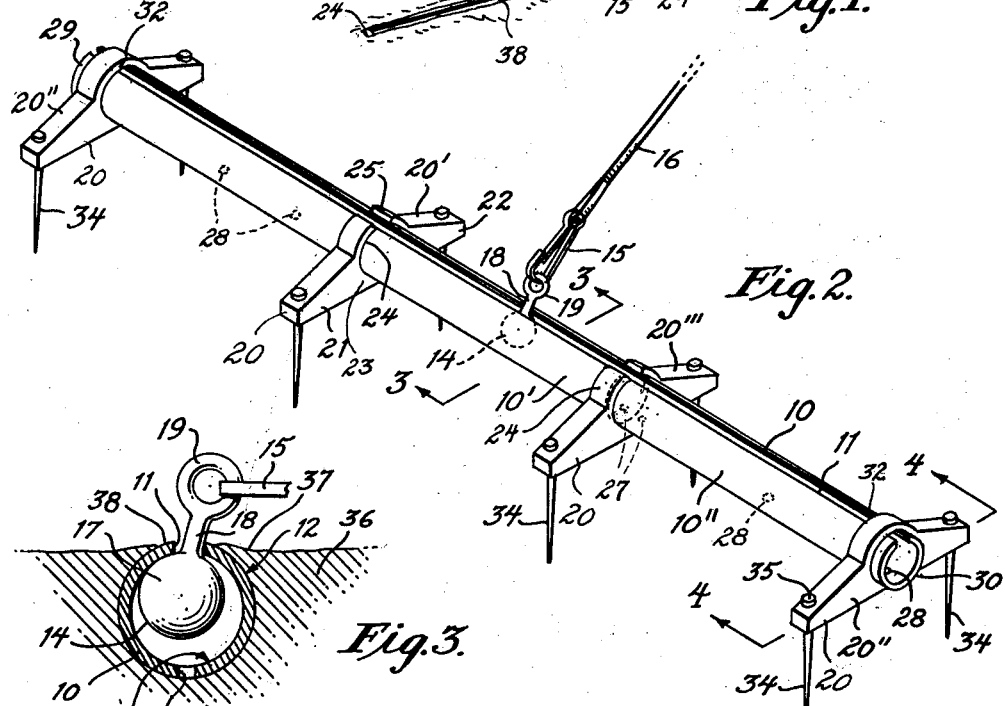
Fig.2.
Fig.3.
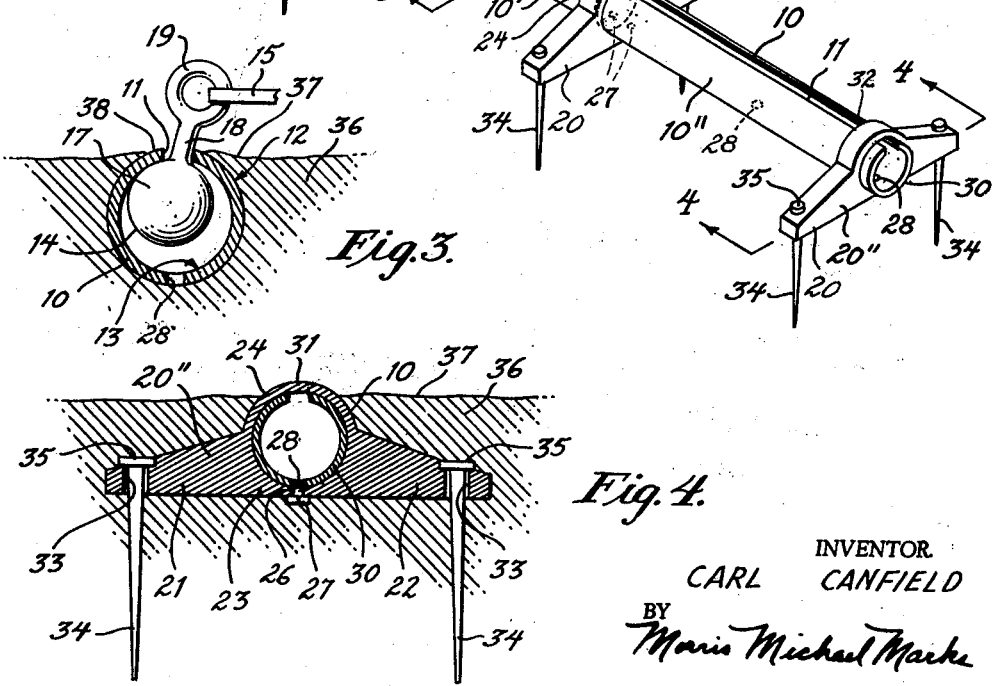
Fig.4.
INVENTOR.
CARL CANFIELD
BY
Maris Michael Marks
ATTORNEY.

United States Patent Office 3,189,003
Patented June 15, 1965

3,189,003
ANIMAL TETHER DEVICES
Carl Canfield, 229 Beechwood Road, Norristown, Pa.
Filed Nov. 16, 1962, Ser. No. 238,106
8 Claims. (Cl. 119—120)

My invention relates to animal tether devices; and it relates more particularly to such devices that will enable an animal to have an extended running area which is greater than that defined by the length of its leash.

In such animal tether devices as hitherto known, a line is suspended between two uprights, and is embraced by a suitable sleeve or eyelet which retains one end of the leash. The other end of the leash is secured to an animal, and when the animal has moved in one direction, to the limit of the length of its leash, further movement is permitted in another direction, along the length of the suspended line. Such devices have proven objectionable however, because when the line is suspended to close to the ground it tends to trip the animal and human beings who may cross it; and when it is suspended high enough above the ground to avoid such tripping, the leash is elevated to a position which enables it to be destructively drawn by the animal about and among the branches of shrubs and plants within the animal running area, and also to become entangled about the animal's body and legs. Indeed, on occasion such elevated leashes have been known to become entangled about the animal's neck and to strangle it.

An object of my invention therefore, is to provide an animal tethering device which will increase the running area of a tethered animal beyond the limits of the length of its leash, but which will be free of the objectionable features of previously known animal tethering devices; and which instead will provide means whereby the animal can freely roam within its restricted area without damage to the branches of plants and shrubs, without possibility of strangulation, and with a minimum of entanglement between the animal and its leash.

Another object of my invention is to provide an animal tethering device of a construction whereby tripping of animals or humans is virtually eliminated.

A further object of my invention is to provide an animal tethering device which can be readily made and shipped in knockdown condition, and placed in operating condition with a minimum of labor, with the simplest of tools or even without tools, and with utmost ease.

Another object of my invention is to provide an animal tethering device which eliminates the objections to hitherto known tethering devices, while being of inexpensive construction and dependable in use.

Further objects will appear from the more detailed description which follows:

For the purpose of illustrating my invention, I have shown in the accompanying drawings one form thereof which is at present preferred by me, since the same has been found to give satisfactory and reliable results, although it is to be understood that the various instrumentalities of which my invention consists can be variously arranged and organized, and that my invention is not limited to the precise arrangements and organizations of the instrumentalities as herein shown and described.

Referring now to the drawings in which like reference characters indicate like parts:

FIGURE 1 represents a perspective view illustrating an animal secured to an animal tethering device embodying my invention; and in phantom view, an animal secured to said tethering device while his leash is wrapped about a tree, and illustrating how the use of my invention avoids entanglement of the leash with the tree's branches.

FIGURE 2 represents a perspective view of an animal tethering device embodying my invention.

FIGURE 3 represents an enlarged, vertical sectional view taken generally along the lines 3—3 of FIGURE 2, and illustrating the tethering device located in place in the ground, and embodying my invention.

FIGURE 4 represents a vertical sectional view taken generally along the lines 4—4 of FIGURE 2, and illustrating the tethering device located in place in the ground, and embodying my invention.

In accordance with my invention, I provide a slotted, hollow, generally tubular track member 10 preferably made of steel, nylon or other suitable material. A slot 11 is longitudinally disposed along the track member 10 and extends from the outer face 12 to the inner face 13 of the hollow track member 10.

A suitable follower member such for instance as the ball type swivel 14 is provided and is adapted to be slideably retained by the track member 10 while securely holding one end 15 of the animal's leash 16. The following member 14 may thus consist of a base portion 17 which may comprise substantially a sphere whose diameter is preferably less than the diameter or width of the interior 13 of the hollow track member 10, or a segment (not shown) of a sphere of a diameter approximately similar to that of said interior 13. A stem 18 projects outwardly from the base member 17 and through the slot 11, and is preferably circular in cross section and of a width substantially less than the width of the slot 11. A retaining portion such for instance as the eyelet 19 is preferably disposed at the outer extremity of the stem 18.

Suitable anchor members 20 may be provided, including intermediate anchor members 20', terminal anchor members 20" and joining anchor members 20'''. These anchor members 20 may comprise bracket portions 21, 22 extending laterally from a retainer portion 23 which is adapted to hold the track member 10 against lateral displacement with respect to said bracket portions 21, 22. Thus for instance, the retainer portion 23 may comprise a sleeve portion 24 having an internal diameter or configuration substantially similar to the external diameter or configuration of the track member 10.

The upper region of the retainer portion 23 of each of the intermediate anchor members 20' which may be used, is slotted as at 25, with the slot 25 being of a width preferably slightly greater than the width of the slot 11.

If desired, the bottom of the retainer portion 23 may be channeled as at 26 to receive a bolt 27 adapted to be threadedly secured to a suitable orifice 28 in the bottom of the track member 10. Moreover, the retainer portion bottom may include two such channels, longitudinally disposed along said sleeve, as for instance in the intermediate, joining anchor member 20'''. There is thus provided means for lengthening the track member 10 by butting sections 10' and 10" within the sleeve portion 24 of the intermediate, joining anchor member 20''', and passing bolts such as the bolt 27 through the channel 26 to secure each butting end region of the track members 10' and 10" to the joining anchor member 20'''. Also if desired, additional orifices 28 may be disposed in the bottom or sides of the track member 10 for purposes of drainage.

The end regions 29, 30 of the track member 10 may be disposed in terminal anchor members 20" having a fully closed portion 31 or other obstruction (not shown) in the upper region of its sleeve 24 operably to provide limiting stops at their inner faces 32 against which the stem 18 of the swivel head 14 may abut in the extreme limits of its travel along the slot 11. The bracket portions 21, 22 may be suitably orificed as at 33 to receive therethrough earth-spikes 34 having heads 35 of greater diameter than the orifices 33.

It is to be understood that the anchor members 20 as herein shown and described are illustrative only and such members may be made in any other suitable manner; or indeed may substantially be dispensed with where other means are relied upon for anchoring.

In assembling the tether device comprising the anchor members 20, the track member 10 may be slidably disposed through the intermediate anchor members 20' which have a slot 25 formed therethrough, to the extent that such intermediate anchor members 20' are used. Should it be desired to lengthen the track member, additional sections 10" may be added by butting them to the next preceding section, as for instance section 10', within an intermediate, joining anchor member 20''', and preferably securing the butting sections to the joining anchor member by means of the bolts 27. When used, the anchor members 20' and 20''' are positioned with their slotted portions 25 substantially embracing the slot 11 of the track member 10. The follower member 14 is also mounted in position, with the base portion 17 disposed in the interior of the hollow track member 10, and the stem 18 projecting outwardly through the slot 11. The terminal anchor members 20'' may then each be slidably mounted about an exposed end region 29, 30 of the ultimate track member 10, and positioned with its fully closed or otherwise obstructed top portion 31 disposed above the slot 11.

The thus arranged assembly is placed on the ground 36 and may be embedded therein by any suitable means, such for instance as by digging and filling, pressing, pounding, or otherwise. In a preferred form, the tubular track member 10 is embedded in the ground to an extent wherein the level 37 of the ground is disposed above the horizontal equator but below the slot 11 of the tube 10. The spikes 34 may be driven through the orifices 33 of the brackets 21, 22, and into the ground therebeneath; and in a preferred form, the space above the spike heads 35 may be filled with earth to the level 37. Thus with the exception of the upwardly convex exposed region 38 of the tubular track 10 in the immediate vicinity of the slot 11, and the upwardly convex exposed regions of the sleeve portion 24 of the anchor members 20, together with the stem 18 and eyelet 19 projecting through the slot 11, the whole assembly is embedded beneath the surface 37 of the earth 36.

The end 15 of the leash 16 is secured to the eyelet 19 by any suitable means, and the opposed end 39 of the leash 16 is attached to the animal 40 by any suitable means such for instance as the dog collar 41.

It will be noted that the follower member 14 is at all times free to swivel about the axis of the stem 18; and that when the animal 40 pulls on the leash 16 until tension is imposed on the end 15 thereof, vectors longitudinal of the slot 11 will be translated into motion of the stem 18 along the slot 11, the follower member 14 preventing said stem 18 from being pulled out of the slot 11. Should the animal 40 tug the leash 16 in a direction substantially perpendicular to the slot 11, the stem 18 will tend to pivot about the slot edge nearest the animal 40 and thereby cause the opposite region of the ball portion 14 to bear against the interior face 13 of the tubular member 10. The major portion of the thrust is thus expended against the broad interior face and the slot 11. Not only is this portion of the tubular member inherently resistant to such forces, but the earth impacted against the embedded portion of the tubular member 10 reenforces said member against lateral displacement, when the eyelet 19 and stem 18 are tugged by the animal 40 in a direction having a vector perpendicular to the slot 11.

In a preferred form, the end regions 29, 30 of the tubular member 10 may be left open to allow for drainage. The slot 11, being so much narrower than the interior 13 of the tubular member 10, and also being disposed along the face 12 of an upwardly convex arc, only a fraction of surface water flowing over the device will find its way to the interior of the tubular member 10; and for much the same reason, very little solid foreign matter will find its way into said interior. Not only will the water be disposed of by drainage, but even should it freeze or combine with foreign matter to cake within the tubular member, it will be found that the device is substantially self-cleaning when in use, for the combintion of rotary, rocking and lineal motion of the follower member 14 will scrape, disintegrate, and otherwise dislodge such accumulations from the walls defining the passage of said follower member 14.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

What I claim as new and desire to secure by Letters Patent is:

1. An animal tether device comprising:
    a substantially hollow, longitudinal track member having a lower portion adapted to be embedded in the ground and an upper portion adapted to be exposed above the ground;
    a longitudinal slot disposed in said upper portion;
    means to secure said track member to the ground with said lower portion embedded in the ground, and said slot in exposed condition; and
    a follower member comprising:
        a base portion adapted to be disposed within said hollow track member,
        a stem projecting from said base portion and through said slot, and
        a retaining portion disposed on said stem and adapted to have secured thereto, the end of an animal leash.

2. An animal tether device as defined in claim 1, and further characterized by:
    the outer surface of said track member being substantially cylindrical, and
    said longitudinal slot being disposed above the horizontal equator of said cylindrical surface.

3. An animal tether device as defined in claim 1, and further characterized by:
    an end of said track member being open for drainage.

4. An animal tether device as defined in claim 1, and further characterized by:
    said means to secure said track member to the ground comprising:
        an anchor member embracing said track member and having a portion traversing said slot in a manner to serve as a limiting stop for said stem portion.

5. An animal tether device as defined in claim 1, and further characterized by:
    said means to secure said track member to the ground comprising:
        an anchor member embracing said track member in a manner to leave said slot free of obstruction therefrom.

6. An animal tether device as defined in claim 1, and further characterized by:
    said base portion of said follower member being rotatable with respect to said track member.

7. An animal tether device as defined in claim 1, and further characterized by:
    the outer surface of said track member being substantially cylindrical, and
    said longitudinal slot being disposed above the horizontal equator of said cylindrical surface;
    an end of said track member being open for drainage;
    said base portion of said follower member being rotatable with respect to said track member;
    said means to secure said track member to the ground comprising:
        an anchor member embracing said track member and having a portion traversing said slot in a manner to serve as a limiting stop for said stem portion, and an anchor member embracing said track member in a manner to leave said slot free of obstruction therefrom.

8. An animal tether device comprising:

two substantially hollow longitudinal track members, each having:
- a lower portion adapted to be embedded in the ground, and
- an upper portion adapted to be exposed above the ground,
- a longitudinal slot disposed in said upper portion;

said track members being adapted to be disposed in butting relation with said slots in registry with each other;

means to secure said track members to the ground with said lower portion of each embedded in said ground, and said slot of each in exposed condition;

said means comprising:
- an anchor member embracing said butting track members in a manner to leave said slots free of obstruction therefrom; and a follower member comprising:
- a base portion adapted to be slideably disposed within said butting hollow track members,
- a stem projecting from said base portion and through the registering slots, and
- a retaining portion disposed on said stem and adapted to have secured thereto, the end of an animal leash.

References Cited by the Examiner

UNITED STATES PATENTS

| | | | |
|---|---|---|---|
| 623,596 | 4/99 | Covington | 119—120 |
| 2,735,394 | 2/56 | Walpole | 119—109 |
| 3,070,068 | 12/62 | Chapman | 119—121 |

FOREIGN PATENTS

| | | |
|---|---|---|
| 35,387 | 4/86 | Germany. |

SAMUEL KOREN, *Primary Examiner.*

ALDRICH F. MEDBERY, *Examiner.*